United States Patent
Muraoka

(10) Patent No.: US 7,079,980 B2
(45) Date of Patent: Jul. 18, 2006

(54) DATA MANAGEMENT SYSTEM AND METHOD

(75) Inventor: Masaki Muraoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/982,076

(22) Filed: Nov. 5, 2004

(65) Prior Publication Data

US 2006/0074593 A1 Apr. 6, 2006

(30) Foreign Application Priority Data

Sep. 15, 2004 (JP) ............................. 2004-267807

(51) Int. Cl.
*G06F 9/00* (2006.01)

(52) U.S. Cl. .............................. 702/182; 707/1; 707/3; 705/1; 718/100; 718/101; 715/500

(58) Field of Classification Search ...................... None
See application file for complete search history.

(56) References Cited

U.S. PATENT DOCUMENTS

| | | | |
|---|---|---|---|
| 5,404,520 A * | 4/1995 | Sonobe ........................ 718/101 |
| 5,404,541 A * | 4/1995 | Hirosawa et al. ............ 713/324 |
| 6,088,704 A * | 7/2000 | Aiba ........................... 707/200 |
| 6,202,060 B1 * | 3/2001 | Tran ............................... 707/3 |
| 6,289,510 B1 * | 9/2001 | Nakajima .................... 717/170 |
| 6,304,867 B1 * | 10/2001 | Schmidt ........................ 707/2 |
| 6,343,279 B1 * | 1/2002 | Bissonette et al. ............ 705/41 |
| 6,351,744 B1 * | 2/2002 | Landresse ...................... 707/8 |
| 6,839,706 B1 * | 1/2005 | Spiers et al. .................... 707/4 |
| 2002/0188626 A1 * | 12/2002 | Tomita et al. .............. 707/205 |
| 2002/0190919 A1 * | 12/2002 | Lee ............................. 345/1.3 |
| 2003/0018605 A1 * | 1/2003 | Policastro et al. ............. 707/1 |
| 2003/0018653 A1 * | 1/2003 | Iwasaki et al. ............. 707/200 |
| 2003/0028731 A1 * | 2/2003 | Spiers et al. ............... 711/147 |
| 2004/0177269 A1 * | 9/2004 | Belnet et al. ............... 713/200 |
| 2005/0210192 A1 * | 9/2005 | Nagasuka et al. .......... 711/114 |
| 2005/0210212 A1 * | 9/2005 | Nagasoe et al. ............ 711/163 |

FOREIGN PATENT DOCUMENTS

JP 2002-099448 4/2002

* cited by examiner

*Primary Examiner*—Carol S. W. Tsai
(74) *Attorney, Agent, or Firm*—Townsend and Townsend and Crew LLP

(57) ABSTRACT

A management system manages data collected at a selected frequency and data collected at a lower frequency. If the lower frequency data is abnormal, it is deleted. Deletion of the data collected at the specified frequency is dependent upon the deletion of the data collected less frequently.

12 Claims, 7 Drawing Sheets

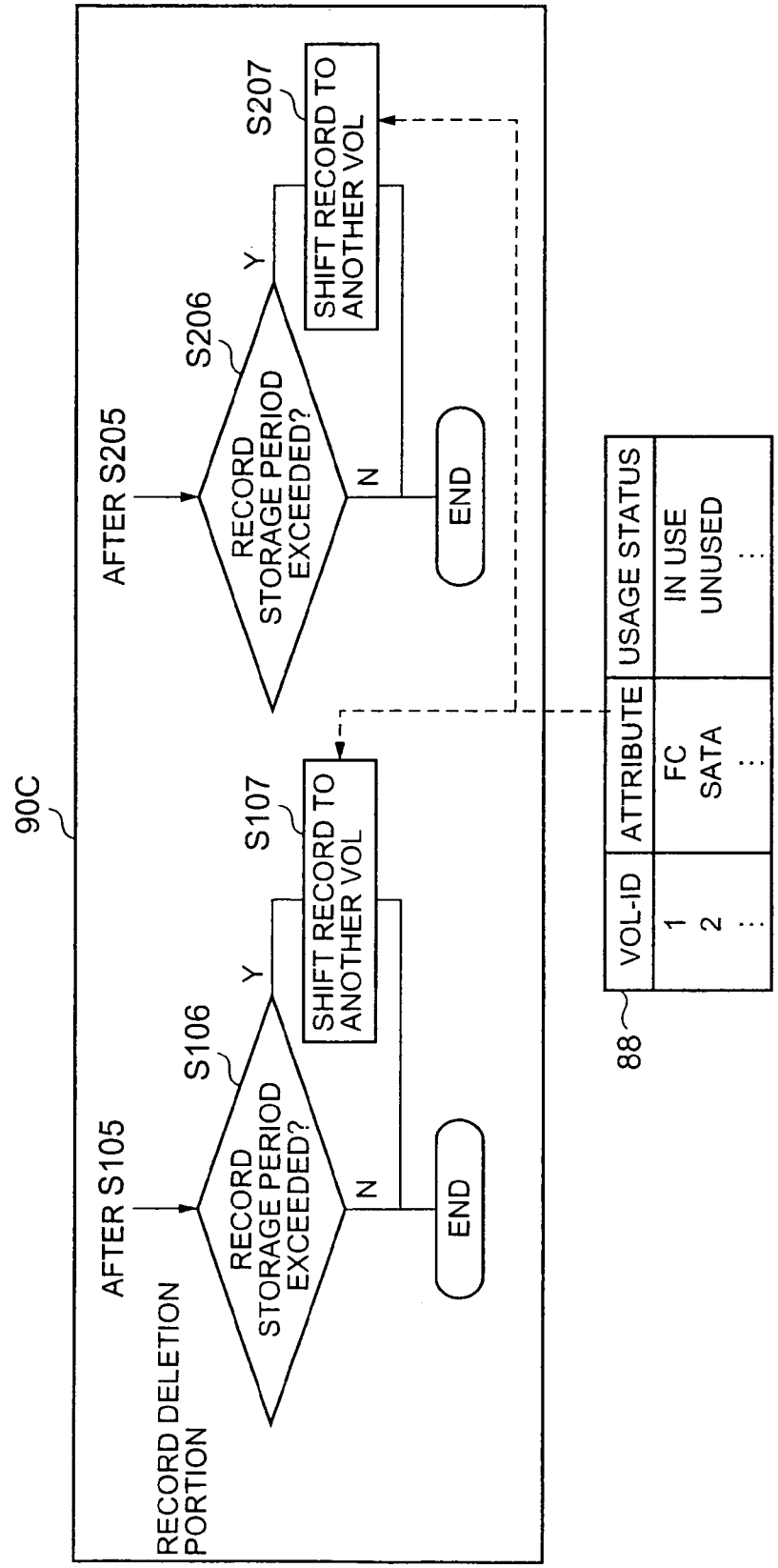

DATA MANAGEMENT SYSTEM AND METHOD

CROSS-REFERENCE TO PRIOR APPLICATION

This application relates to and claims priority from Japanese Patent Application No. 2004-267807, filed on Sep. 15, 2004, the entire disclosure of which is incorporated herein by reference.

BACKGROUND OF THE INVENTION

1. Field of the Invention

The present invention relates to a computer technology for managing data.

2. Description of the Related Art

Computer technology for managing data is known. As managed data, data that represents the results of monitoring by the performance monitoring device disclosed by Japanese Patent Application Laid Open No. 2002-99448 or data that represents the results of monitoring various states of computer machines, and so forth, may be considered, for example.

For example, cases may include one where a monitoring device that monitors a state of a certain kind of a computer machine (the CPU usage rate, for example) generates a record that represents the results of this monitoring ('monitoring result record' hereinbelow) at regular intervals and manages the monitoring result records thus generated. Further, there can also be cases where a monitoring device generates a summary record that represents a summary of a plurality of monitoring results represented by a plurality of monitoring result records at regular intervals and manages the summary records thus generated together with the plurality of monitoring result records that form the basis of these summary records. In this case, in order to prevent the managed record group from becoming huge, a method according to which the monitoring device manages the monitoring result records that are generated in each first time unit (every minute, for example) in a first period and deletes monitoring result records if the first period is exceeded, and manages summary records that are generated in each second time unit (every hour, for example) that is greater than the first time unit in a second period that is longer than the first period and deletes summary records if the second period is exceeded may be considered.

However, with this method, in cases where the monitoring device detects a summary record representing a unique monitoring result and there is the desire to acquire a plurality of monitoring result records that form the basis of the summary record, for example, sometimes at least one of the plurality of monitoring result records that is to be acquired has already been deleted. When the management period of the monitoring result record is extended, for example, in order to avoid this problem, there is then a large volume of record groups to be managed.

This problem is not limited to a case where a plurality of monitoring result records and summary records are managed and can arise in a case where a data group, which includes a plurality of lower level data and upper level data for each of this plurality of lower level data, is managed.

SUMMARY OF THE INVENTION

Therefore, an object of the present invention is to manage efficiently a data group that includes a plurality of lower level data and upper level data for each of the plurality of lower level data. More specifically, for example, an object of the present invention is to manage efficiently a record group that includes a plurality of monitoring result records and summary records that are generated on the basis of the plurality of monitoring result records.

Further objects will become evident from the following description.

A data management system according to a first aspect of the present invention is capable of accessing a storage device and comprises one or more processors, and a storage region for storing one or more computer programs that allow the one or more processors to operate as a result of being read by the one or more processors. The one or more processors, which read the one or more computer programs from the storage region, perform processes (A) to (D) below:

(A) processing to acquire, at a first frequency, monitoring result data that represents monitoring results for a monitoring target, generate a monitoring result record that includes the monitoring result data thus acquired and first deletion condition data that represents a first deletion condition for the monitoring result data, and store the generated monitoring result record in the storage device;

(B) processing to generate monitoring result summary data that represents a summary of a plurality of monitoring results represented by a plurality of the monitoring result record stored in the storage device at a second frequency that is lower than the first frequency, determine a second deletion condition for normal state when the content of the summary of the plurality of monitoring results represents normal content and determine a second deletion condition for abnormal state when the summary content represents abnormal content, generate a summary record that includes second deletion condition data that represents the second deletion condition thus determined and the monitoring result summary data thus generated, and then store the generated summary record in the storage device;

(C) processing to specify a summary record including second deletion condition data representing the second deletion condition for abnormal state from the storage device and specify a plurality of the monitoring result records that form the basis of the generation of the specified summary record; and (D) processing to update the first deletion condition that is represented by the first deletion condition data of each of the plurality of monitoring result records thus specified to a second deletion condition for abnormal state that is represented by the second deletion condition data included in the specified summary record.

Here, the 'monitoring target' is a target that is monitored by the data management system or another system, such as the CPU usage rate or power supply state of a computer machine, for example. The monitoring target may be either inside or outside the data management system.

The 'monitoring result data' may be generated by the one or more processors or may be received from a system outside the data management system.

The 'frequency' is the number of times that data is acquired within a certain period, for example. More specifically, when the data is acquired at regular intervals, for example, 'frequency' may mean 'time unit'.

The data management system can be constituted by a server or storage device, or by a combination thereof, for example. Processes (A) to (D) above can be performed singly by the server or storage device or can be shared by the server and storage device. The storage device may also be provided in the server. The storage device may be a physical storage device or a logical storage device. In addition, the data management processing system may delete a monitoring result record from the storage device in accordance with deletion condition data that is contained in the monitoring result record. This process can also be performed singly by the server or storage device, for example.

A data management system according to a second aspect of the present invention can comprise a lower level data acquisition/storage portion, an upper level data acquisition/storage portion, a first deletion condition setting portion, and a second deletion condition setting portion. The lower level data acquisition/storage portion acquires lower level data at a first frequency and stores the acquired lower level data in the storage device. The upper level data acquisition/storage portion acquires upper level data that is data above each of a plurality of the lower level data stored in the storage device at a second frequency that is lower than the first frequency and stores the upper level data thus acquired in the storage device. The first deletion condition setting portion sets, when the upper level data represents an abnormal state, a deletion condition from the storage device of the upper level data representing an abnormal state. The second deletion condition setting portion sets a deletion condition for each of a plurality of lower level data corresponding with the upper level data representing an abnormal state as a deletion condition that differs from the deletion condition of the lower level data representing a normal state, on the basis of the set deletion condition of the upper level data representing an abnormal state.

In cases where the deletion condition of the upper level data representing an abnormal state is set, for example, the data management system may determine the method for updating the deletion conditions of the plurality of lower level data corresponding with the upper level data on the basis of a pre-established rule for setting a deletion condition. Update methods include, for example, a method that applies a deletion condition that is the same as the deletion condition of the upper level data to the lower level data or a method that calculates the deletion condition of the upper level data representing an abnormal state as another deletion condition by means of a predetermined method and applies this other deletion condition.

In a first embodiment of the data management system, the deletion condition includes a deletion time at which data is deleted from the storage device. The first deletion condition setting portion sets, as the deletion time of upper level data representing an abnormal state, a deletion time that is later than the deletion time of upper level data representing a normal state. The second deletion condition setting portion sets the deletion times of each of the plurality of lower level data as deletion times that are later than the deletion times of the lower level data representing a normal state. Further, as a method for setting the deletion time of lower level data to a later deletion time, for example, a method that sets and corrects the lower-level data deletion time itself to a later deletion time or adds a deletion-condition extension period without changing the content of the original deletion time may be considered. Further, the 'deletion time' may be expressed as a storage period or as the time at which the storage period ends, for example.

In a second embodiment of the data management system, according to the first embodiment, the lower level data acquisition/storage portion generates a lower level record that includes second deletion time data representing a second deletion time of the acquired lower level data and the acquired lower level data and stores the lower level record thus generated in the storage device. The first deletion time setting portion sets a first deletion time for normal state that represents the deletion time of the upper level data representing a normal state and sets a first deletion time for abnormal state that represents the deletion time of the upper level data representing an abnormal state. The upper level data acquisition/storage portion generates an upper level record that includes first deletion time data that represents the set first deletion time and the acquired upper level data and stores the generated upper level record in the storage device. When the first deletion time data in the upper level record represents the first deletion time for abnormal state, the second deletion time setting portion changes the second deletion time represented by the second deletion time data of each of the plurality of lower level records corresponding with the upper level record representing an abnormal state to a later deletion time on the basis of the first deletion time for abnormal state.

In a third embodiment of the data management system, according to the second embodiment, in certain lower level data among a plurality of lower level data corresponding with the upper level record representing an abnormal state, the second deletion time setting portion keeps the second deletion time as is when the second deletion time represented by the second deletion time data is later than the first deletion time for abnormal state.

In a fourth embodiment of the data management system, the data management system is also able to access another storage device and further comprises a data deletion/shift portion that deletes or shifts data. The data deletion/shift portion deletes the upper level data representing a normal state and each of the plurality of lower level data corresponding with the upper level data from the storage device when the deletion conditions of the data are matched, and shifts at least one of the upper level data representing an abnormal state and the plurality of lower level data corresponding with the upper level data from the storage device to the other storage device when the deletion conditions of the data are matched. According to this embodiment, for example, the data processing system may comprise the storage device or another storage device may be provided outside the data processing system. Further, the storage device may be a high-performance or high-reliability device, while the other storage device may be a lower-performance or lower-reliability device.

A data management method according to a third aspect of the present invention comprises the steps of acquiring lower level data at a first frequency and storing the acquired lower level data in a storage device; acquiring upper level data that is data above each of a plurality of the lower level data stored in the storage device at a second frequency that is lower than the first frequency and storing the upper level data thus acquired in the storage device; setting, when the upper level data represents an abnormal state, a deletion condition from the storage device of the upper level data representing an abnormal state; and setting a deletion condition for each of a plurality of lower level data corresponding with the upper level data representing an abnormal state as a deletion condition that differs from the deletion condition of the lower level data representing a normal state, on the basis of the set deletion condition of the upper level data representing an abnormal state. All the main constituents of these steps can be computers.

A computer program according to a fourth aspect of the present invention is a computer-readable computer program that allows a computer to execute the steps of acquiring lower level data at a first frequency and storing the acquired lower level data in a storage device; acquiring upper level data that is data above each of a plurality of the lower level data stored in the storage device at a second frequency that is lower than the first frequency and storing the upper level data thus acquired in the storage device; setting, when the upper level data represents an abnormal state, a deletion condition from the storage device of the upper level data representing an abnormal state; and setting a deletion condition for each of a plurality of lower level data corresponding with the upper level data representing an abnormal state as a deletion condition that differs from the deletion condition of the lower level data representing a normal state, on the basis of the set deletion condition of the upper level data representing an abnormal state. This computer program may be recorded on a recording medium (a CD-ROM, for example) and installed on a computer from the recording medium, or may be installed on the computer via a communication network.

According to the present invention, a data group, which includes a plurality of lower level data and upper level data for each of the plurality of lower level data, can be efficiently managed.

BRIEF DESCRIPTION OF THE DRAWINGS

FIG. 7 shows a modified example of the server program according to an embodiment of the present invention as well as an example of the flow of processing that is executed by the server program.

DETAILED DESCRIPTION OF THE PREFERRED EMBODIMENTS

An embodiment of the present invention will be described hereinbelow with reference to the drawings.

Figure 1:
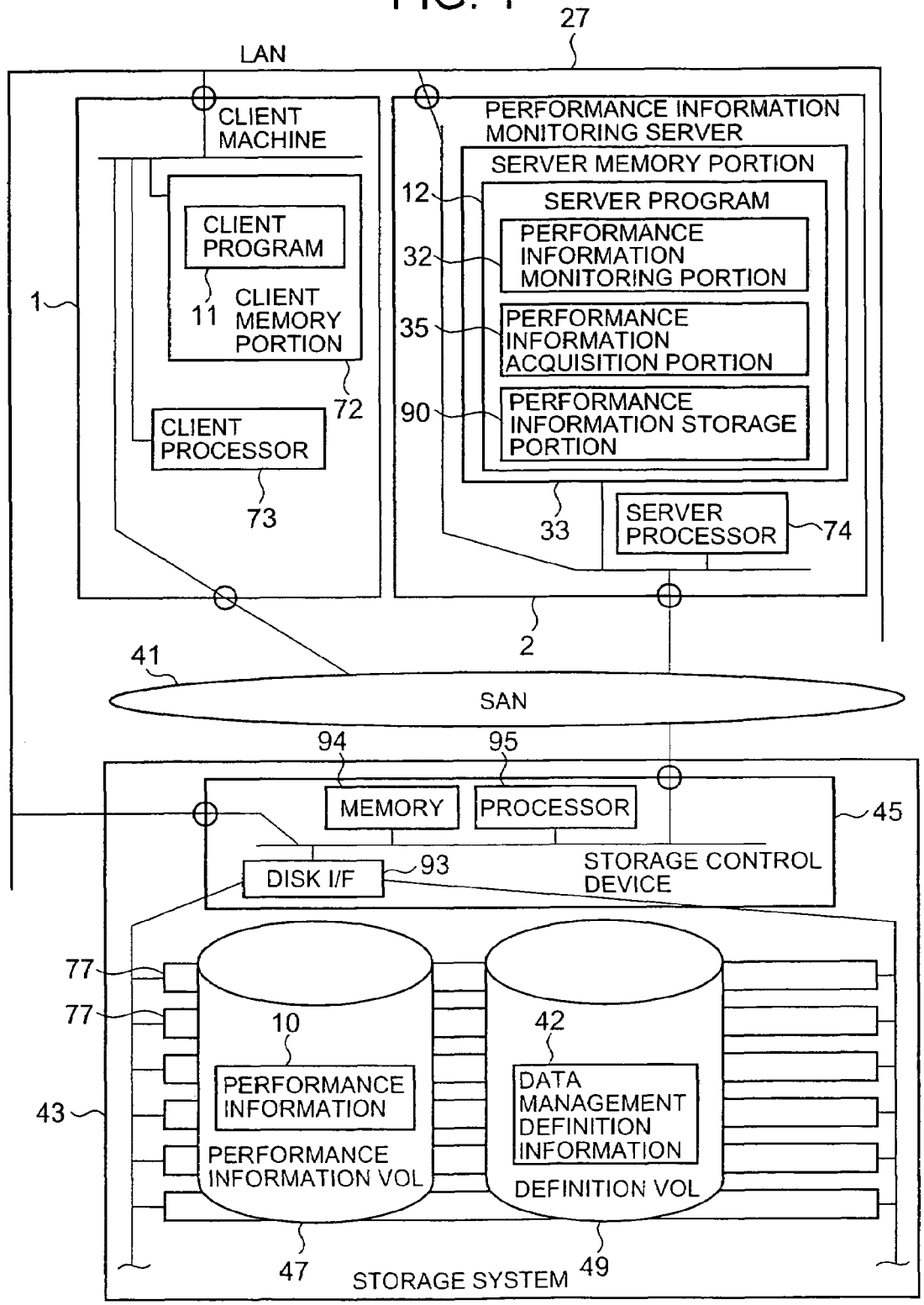
FIG. 1 shows a constitutional example of the data management system according to the first embodiment of the present invention.

FIG. 1 shows a constitutional example of a data management system according to an embodiment of the present invention.

A client machine 1, a performance monitoring server 2, and a storage system 43 are connected to a first communication network such as a LAN (Local Area Network) 27. The client machine 1, performance monitoring server 2, and storage system 43 are also connected to a second communication network such as a SAN (Storage Area Network) 41.

The client machine 1 is an information processing device such as a personal computer, for example. The client machine 1 comprises a client processor (CPU, for example) 73 and a client memory portion (at least one of a memory and hard disk, for example) 72. A client program 11 is stored in the client memory portion 72. The information processing device functions as the client machine 1 as a result of the client program 11 that is stored in the client memory portion 72 being read to the client processor 73. The client program 11 may be application software, which operates on an operating system (OS) (not shown) of the client machine 1 or may be integrated into the OS.

The performance monitoring server 2 is one information processing device that comprises a server memory portion 4 and a server processor 74 (a CPU, for example), for example. The server memory portion 4 comprises at least one of a memory (RAM, ROM, or the like, for example) and a hard disk. A server program 12, for example, is recorded on the server memory portion 4. The server program 12 is at least one program module that comprises a performance monitoring portion 32, a performance data acquisition portion 35, and a performance data storage portion 90, for example. The information processing device functions as a performance monitoring server 2 as a result of a server program 33 stored in the server memory portion 4 being read by the server processor 74. For example, the performance monitoring server 2 is able to monitor the fluctuating performance of a certain device (the CPU usage rate, for example) and generate data that represents this monitored state (called 'performance data' hereinbelow). Performance data can be data that represents the performance of each OS, application program or database, for example. More specifically, for example, the performance data may be at least one of the CPU usage rate of the OS, the number of running processes of the OS, the database usage rate, SQL information, parameter information, application roll area usage rate and the response time. At least one of the monitored OS, application program and database may exist in the performance monitoring server 2 or may exist in a device outside the server 2 (in client machine 1 or storage system 43, for example). The performance monitoring server 2 may generate performance data on the basis of the performance monitoring results or may receive performance data via the LAN 27 or the like from a monitoring target that exists outside the server 2.

The storage system 43 is a RAID (Redundant Array of Independent Inexpensive Disks) system that is constituted with a plurality of disk-type storage devices (hard disk drives, for example) 77 arranged in the form of an array, for example. The storage system 43 comprises a plurality of logical volumes provided in one or more disk-type storage devices 77 and a storage control device 45 that controls communications between at least one of the client machine 1 and the performance monitoring server 2 (generically termed 'upper level device' hereinbelow) and the plurality of logical volumes.

The plurality of logical volumes includes, for example, a logical volume (performance information VOL) 47 in which performance information 10 containing one or more performance data items are stored and a logical volume (definition VOL) 49 in which data management definition information 42 is stored. Further, at least one of these logical volumes 47 and 49 may be provided in a server memory portion 35. That is, performance data acquired by the performance monitoring server 2 may be saved in the server memory portion 4 of the performance monitoring server 2 in place of or in addition to being saved in the disk-type storage device 77 of the storage system 43.

The storage control device 45 comprises, for example, one or more processors (MPU (Micro Processing Units) or CPU (Central Processing Unit), for example) 95 that execute processing and so forth corresponding with a variety of commands from an upper level device, a memory 94 that comprises a buffer region or the like in which data received from the upper level device is temporarily stored, and a disk interface device (disk I/F hereinbelow) 93 that is an interface for the disk-type storage device 77. In response to an I/O request (a read command or write command, for example) from the upper level device, the storage control device 45 is able to write information received from the upper level device to a logical volume and transfer the information in the logical volume to the upper level device.

Figure 2:
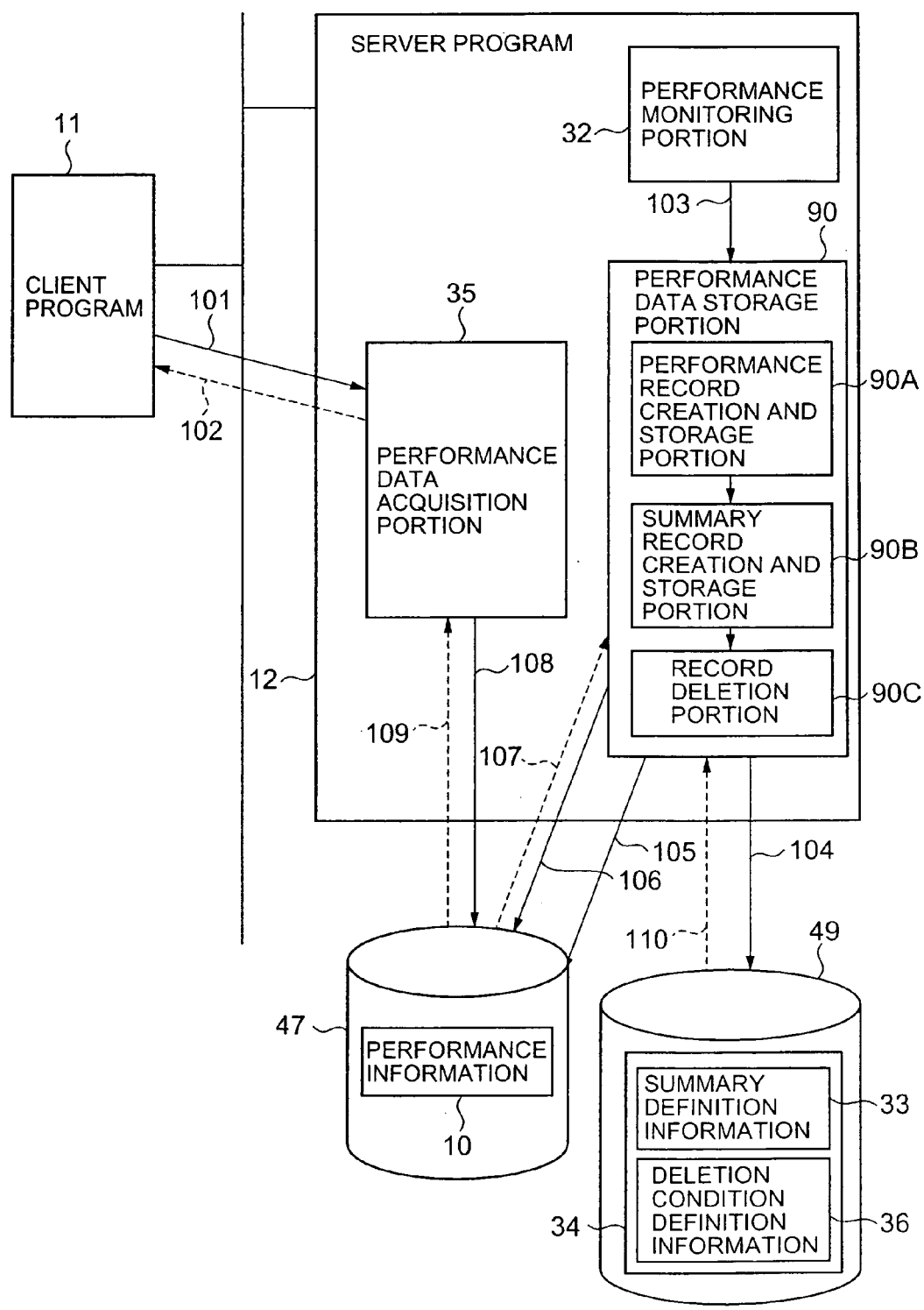
FIG. 2 schematically shows the principal parts according to this embodiment in the data management system shown in FIG. 1.

FIG. 2 provides an outline of the principal parts of this embodiment in the data management system shown in FIG. 1.

As indicated by the solid line arrow 101, the client program 11 asks the server program 12 to reference performance information. In response to this request, the performance data acquisition portion 35 of the server program 12 accesses the performance information VOL 47 as indicated by the solid line arrow 108 and reads out all or part of the performance information 10 as indicated by the dotted line arrow 109. The performance data acquisition portion 35 transmits all or part of the performance information 10 thus read to the client program 11 as indicated by the dotted-line arrow 102. Further, the part of the performance information 10 that is read out or transmitted can be a performance record, all or part of performance minute records, all or part of performance hour records, all or part of performance day records, or can be a combination of these records. A description of the performance records will be provided below.

The performance monitoring portion 32 acquires performance data (generates or receives from outside, for example) and passes the acquired performance data to the performance data storage portion 90 as indicated by the arrow 103. The performance monitoring portion 32 acquires performance data in minute units, for example, at regular intervals (or irregular intervals).

When performance data is passed from the performance monitoring portion 32, the performance data storage portion 90 detects the time at this point (detects the time by using a timer in the server 2, for example). Alternatively, the performance data storage portion 90 detects the time when performance data described subsequently is generated. As indicated by the solid line arrow 104, the performance data storage portion 90 accesses the definition VOL 49 and acquires all or part of data management definition information 34 as indicated by the dotted line arrow 110. The performance data storage portion 90 generates deletion condition data representing a deletion condition on the basis of performance data that is relayed from the performance monitoring unit 32 and the acquired data management definition information 34. The performance data storage portion 90 generates a performance record that includes performance data, collection time data representing the detected time (hereinafter 'collection time'), and the generated deletion condition data and, as indicated by the solid line arrow 105, stores the generated performance record in the performance information VOL 47. Further, as indicated by the same arrow 105, the performance data storage portion 90 is able to update or delete the main performance record of the performance information 10 in the performance information VOL 47. Further, as indicated by the solid line arrow 106, the performance data storage portion 90 accesses the performance information VOL 47 and, as indicated by the dotted line arrow 107, is also able to read all or part of the performance information 10. The performance data storage portion 90 comprises a performance record creation and storage portion 90A, a summary record creation and storage portion 90B, and a record deletion portion 90C. Each of these 90A, 90B, and 90C are program modules, for example. The processing performed by each of the 90A, 90B and 90C will be described subsequently.

Figure 3A:
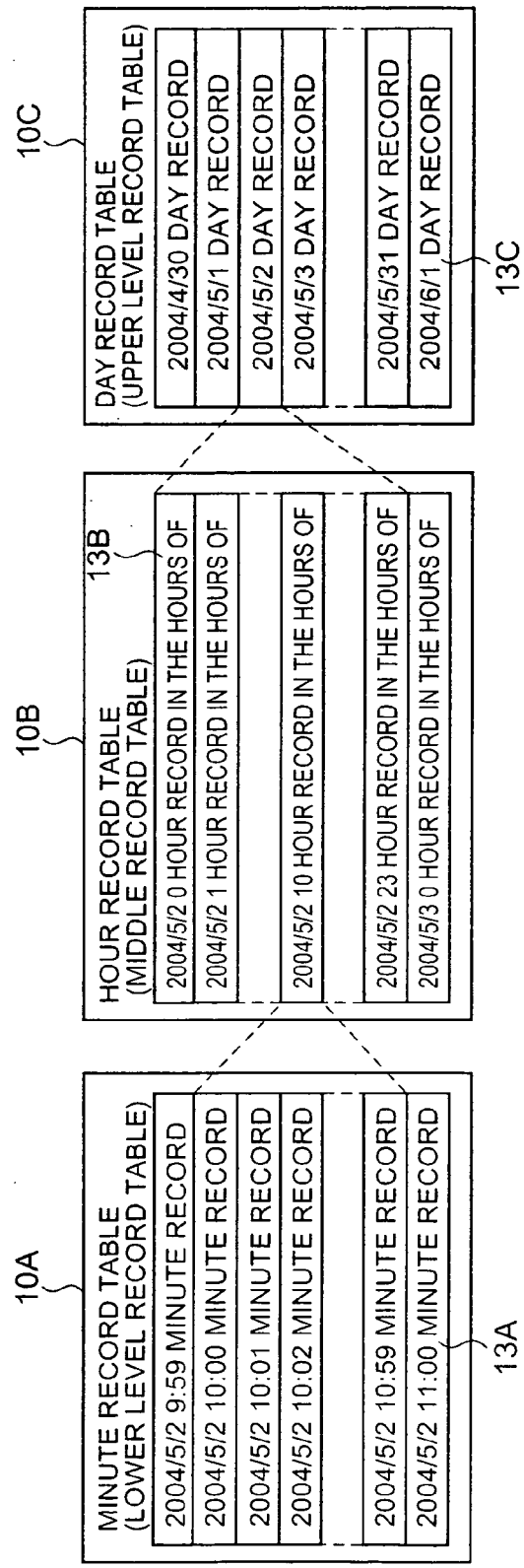
FIG. 3A shows a constitutional example of performance information.

The performance information 10 is information including a plurality of performance records. FIG. 3A shows a constitutional example of the performance information 10. The region in which the performance information 10 is stored is divided into a plurality of subregions. Each of the plurality of subregions corresponds with performance records of a plurality of types, for example. The type of performance record differs depending on what kind of time unit among a plurality of time units to which this record relates.

More specifically, for example, the performance records of a plurality of types include a performance record that is generated in minute units ('minute record' hereinbelow) 13A, a performance summary record ('hour record' hereinbelow) 13B that summarizes minute records corresponding to a certain hour (sixty minute records, for example) and a performance summary record ('day record' hereinbelow) 13C that summarizes hour records corresponding to a certain day (twenty-four hour records, for example). The day record 13C is an upper level record, the hour record 13B is a record one level below the day record 13C and the minute record 13A is a record that is one level below the hour record 13B.

The plurality of subregions include a minute record table 10A in which one or more minute records 13A are stored, an hour record table 10B in which one or more hour records 13B are stored, and a day record table 10C in which one or more day records 13C are stored. Each of the performance records 13A to 13C of the plurality of types registered in the plurality of tables 10A to 10C is associated with a record that is above or below itself. The server program 12 is able to grasp which upper or lower level record a certain performance record is associated with by referencing collection time data in the respective collection time fields of the certain performance record and of the upper or lower level performance records thereof respectively, for example. More specifically, it can be seen that the minute record 13A, for which the collection time is zero to fifty-nine minutes past h (hour), corresponds with the hour record 13B, for which the collection time data is h hours and zero minutes, and that the hour record, for which the collection time data is d days and zero to twenty-three hours, corresponds with the day record 13C for which the collection time is d days, zero hours, and zero minutes, for example. Further, the time unit levels may be in fewer or more levels than the three levels of minutes, hours and days. In this case also, the above procedure of grasping the relationship of correspondence from collection time data can be adopted.

Figure 3B:
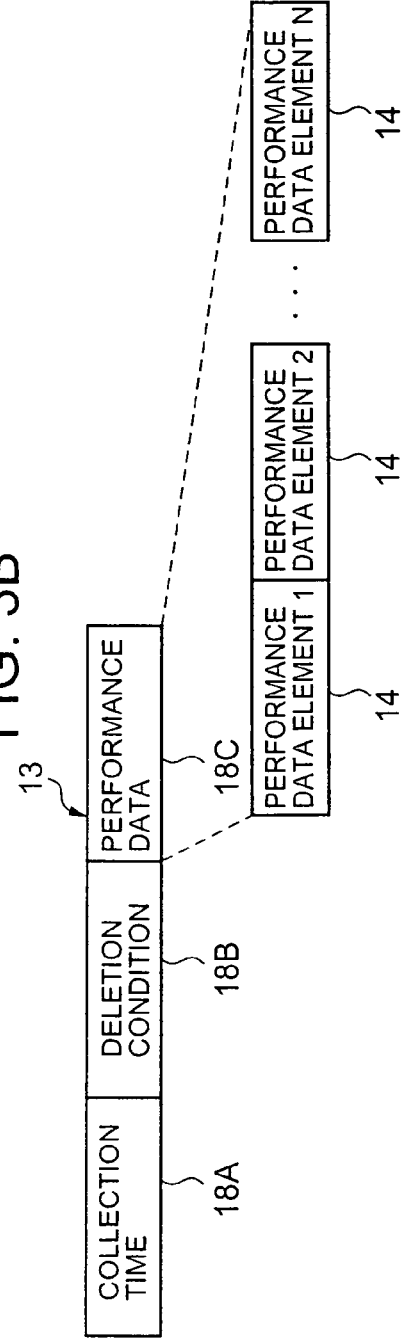
FIG. 3B shows a constitutional example of a performance record.

FIG. 3B shows a constitutional example of a performance record.

A performance record 13 includes a collection time field 18A in which performance time data is registered, a deletion condition field 18B in which deletion condition data is registered, and a performance data field 18C in which performance data is registered. The performance data field 18C may comprise one or more subdata fields 14, 14, . . . in which one or more performance data elements constituting performance data are each registered. Performance data elements can be the CPU usage rate, the number of paging instances, and so forth.

The constitution of the performance record 13 can be the same irrespective of the type of performance record 13. For example, the performance data storage portion 90 is able to register data representing the collection time (year/month/day/hour/minutes, for example) of the minute record 13A in the collection time field 18A of the minute record 13A, register data (year/month/day/hour/minutes, for example) representing an hour record that is generated on the basis of a plurality of minutes records 13A of a collection time at a certain hour in the collection time field 18A of the hour record 13B, and register data representing a day record that is generated on the basis of a plurality of hour records 13B with a collection time of a certain day (year/month/day, for example) in the collection time field 18A of the day record 13C. The server program 12 is able to grasp which upper or lower level record a certain performance record is associated with and grasp that there is a relationship of correspondence as illustrated by the dotted line in FIG. 3A, for example, by referencing the collection time data in the collection time field of the certain performance record and the upper and lower level performance records thereof respectively.

Let us now refer to FIG. 2 once again.

The data management definition information 34 is information relating to the definition of the data management method (a data or computer program, for example). The data management definition information 34 includes deletion condition definition information 36 and summary definition information 33.

Figure 4A:
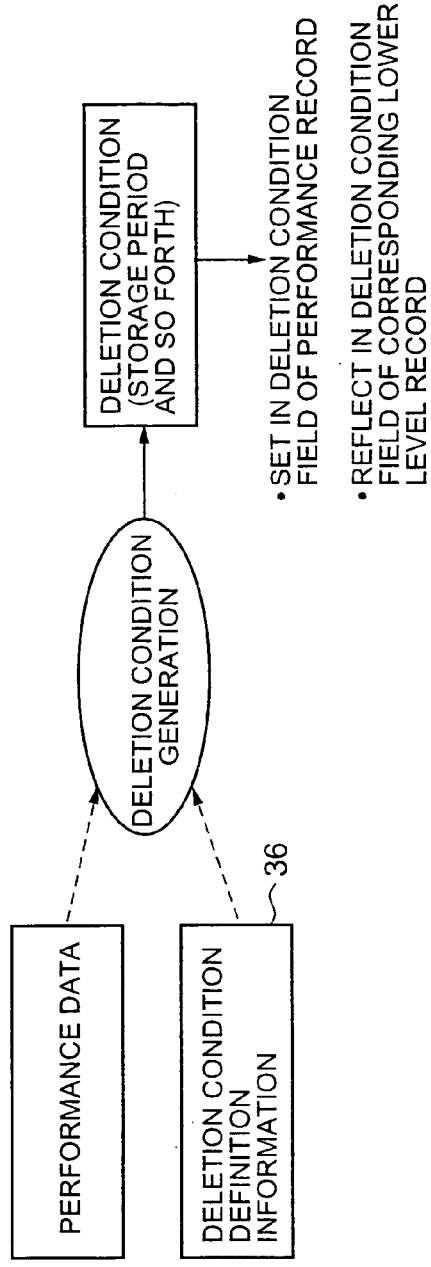
FIG. 4A shows an outline of a method for generating a deletion condition.

The deletion condition definition information 36 is data or a computer program in which rules for setting deletion conditions are defined. More specifically, for example, the deletion condition definition information 36 is a program (script) that generates a storage deadline or the like for the performance record from at least one performance data element that is included in the performance data. For example, when the performance data element represents the CPU usage rate, in order to generate the deletion condition that 'the storage period of a performance record for which it is detected that the variation in the CPU usage rate exceeds 50% should be one month and the storage period of a performance record for which it is detected that the variation in the CPU usage rate is 50% or less should be two months', the script image is as follows: if (abs(CPU %–CPU %[−1]) >50) return "storage period >one month" else return "storage period >2 days". As shown in FIG. 4A, the server program 12 is able to generate a deletion condition by referencing such deletion condition definition information 36 and performance data and then set data for the generated deletion condition in a performance record. Further, when a deletion condition for an upper level performance record is generated, the deletion condition can be reflected in at least one lower level performance record that corresponds with the upper level performance record.

The deletion condition definition information 36 can be of varied content. For example, when performance data elements of a plurality of types are included in the performance data, the rules for setting the storage periods for each type of performance data element can be defined and have content such that the longest storage period is then the deletion condition that is ultimately registered in the deletion condition field. Further, the deletion condition definition information 36 may include an information element that represents a rule for setting deletion conditions by performance record types. For example, deletion condition definition information elements for an upper level performance record may include data or a program that represents not only a rule for setting a deletion condition for this performance record but also a rule regarding the way in which the deletion condition is to be reflected in the performance record below this performance record (for example, as to whether to establish a deletion condition that is the same as the deletion condition of the upper level performance record for the lower level performance record corresponding with this performance record or to calculate the deletion condition of the upper level performance record as another deletion condition by means of a predetermined method and then establish this other deletion condition). More specifically, for example, hour-record deletion condition definition information elements may include the deletion condition "storage period >1 month", which is set for an hour record in the case of data representing the fact that the 'CPU usage rate of the hour record exceeds 60%', and the deletion condition "and not exists (upper level record)", which is added to the corresponding lower-level minute record. In this case, when "storage period >one day", for example, has been registered in the deletion condition field of the original minute record, content such as "storage period >1 day and not exists (upper level record)", that is, '[the lower level record] is saved until the upper level record is deleted when the storage period exceeds one day' is newly registered in the deletion field.

The summary definition information 33 is data or a program whereby a method for creating upper level data from a plurality of lower level data is defined. The summary definition information 33 includes, for example, information elements representing a summary timing definition and information elements representing a summary method definition, for example.

As a summary timing definition, in the case of the definition of a minute record, for example, a definition regarding whether to create upper summary data (hour data) every minute or to create upper summary data every hour can be adopted. Further, when upper summary data is created every minute, the number of minute records and the number of hour records are the same. In this case, one lower level record corresponds with a plurality of upper level records. At such time, when two or more upper level records among the plurality of upper level records are upper level records that represent an abnormal state, two or more deletion conditions can be reflected in the lower level record on the basis of the two or more upper level records. In this case, a deletion condition that the time for deletion should be the most remote time among the two or more deletion conditions may be selected and reflected in the lower level record.

As a summary method definition, for example, a definition that sets any of the average value, total value, maximum value or minimum value of the plurality of performance data corresponding with the plurality of lower level data as the performance data of the upper level data can be adopted. Further, this summary method definition can be established by the type of performance data element. For example, the summary method may be established so that the average value is adopted when the performance data element is the CPU usage rate or the total value is adopted when the performance data element is the access frequency.

Figure 4B:
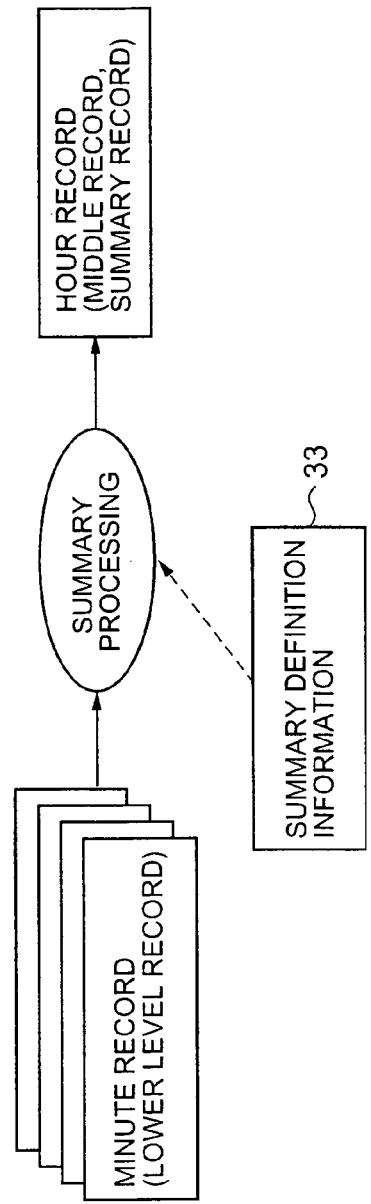
FIG. 4B shows an outline of a method for generating a summary record.

The server program 12 can generate an upper level record (hour record, for example) from a plurality of lower level records (minute records, for example) as shown in FIG. 4B, for example, by referencing such summary definition information 33.

Figure 5:
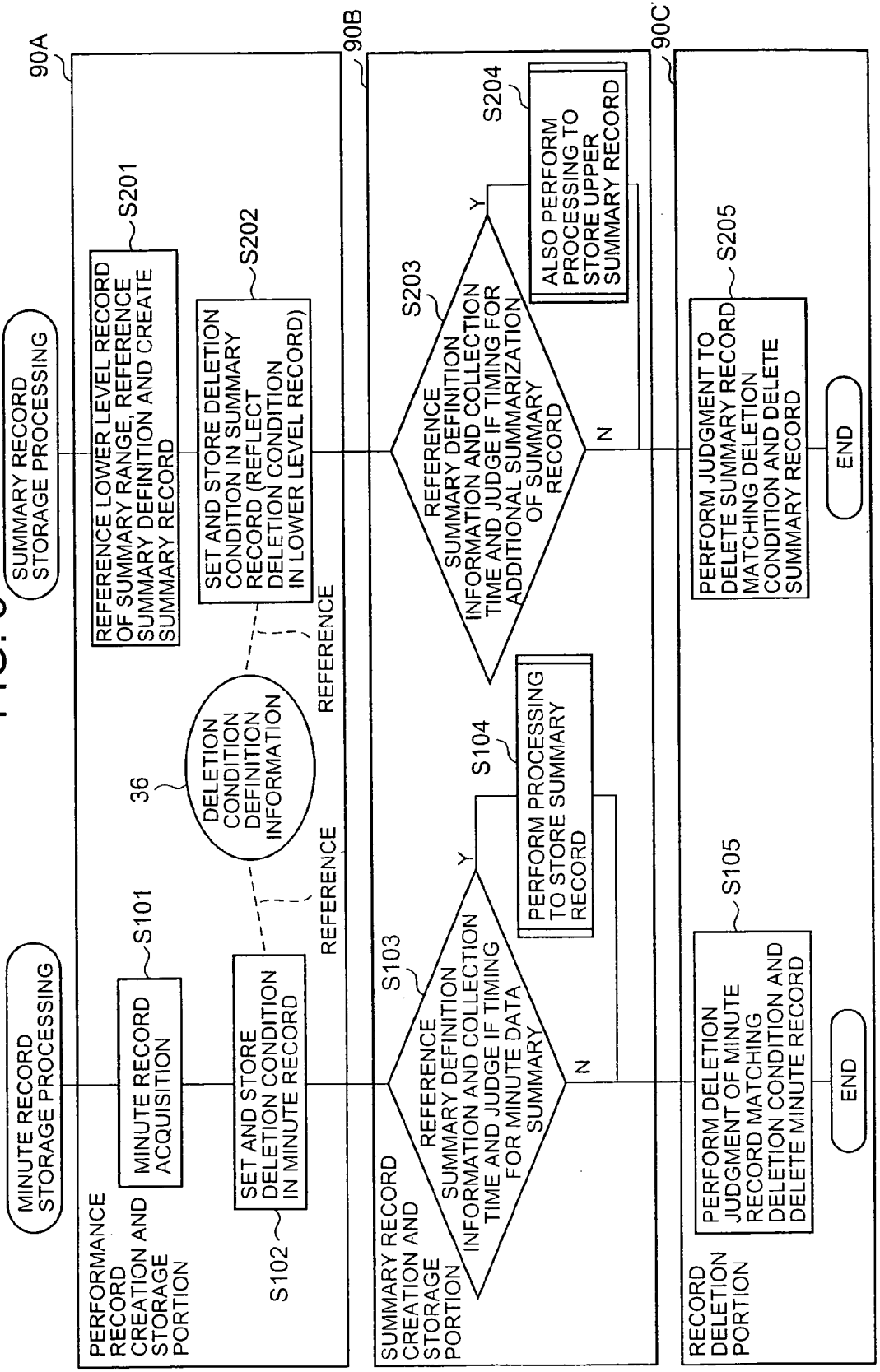
FIG. 5 shows an example of the flow of processing that is executed by a server program.

FIG. 5 shows an example of the flow of processing that is executed by the server program 12.

First, the processing to store the minute record 13A will be described.

The performance record creation and storage portion 90A acquires a minute record in which the deletion condition field 18B is blank (step S101). Here, for example, the performance record creation and storage portion 90A may receive this minute record from the performance monitoring portion 32 or may generate this minute record on the basis of the performance data received from the performance monitoring portion 32 and the collection time of this performance data.

The performance record creation and storage portion 90A generates a deletion condition that conforms with the content of the performance data on the basis of the performance data in the minute record acquired in S101 and the deletion condition definition information 33, sets data representing the generated deletion condition in the blank performance condition field 18B in the minute record acquired in S101, and then stores this minute record in the performance information VOL 47 (S102).

The summary record creation and storage portion 90B references the collection time data in the minute record in the performance information VOL 47 and the summary definition information 33 in the definition VOL 49 and judges whether this is the summary timing for the minute record (S103). When an affirmative judgment result is obtained in the processing of S103, the summary record creation and storage portion 90B causes the performance record creation and storage portion 90A to start the processing of S201 (S104).

The record deletion portion 90C references deletion condition data in each minute record within the performance information VOL 47 and, if this point in time matches the deletion condition represented by the deletion condition data (if the difference between the minute record collection time and the current time is greater than the storage deadlines set as the deletion condition, for example) the record deletion portion 90C then deletes the minute record containing the deletion condition data (S105). The record deletion portion 90C is able to execute the processing of S105 at regular intervals (or irregular intervals).

Next, the summary record storage processing will be described.

The performance record creation and storage portion 90A references the summary definition information 33 in the definition VOL 49, specifies a range of lower level records (minute records or hour records, for example), which form the basis of the summary record that is to be created, from this information 33, and creates a summary record (hour record or day record, for example) in which the deletion condition field 18B is blank on the basis of the lower level records in the specified range and the summary definition information 33(S201).

The performance record creation and storage portion 90A generates a deletion condition that conforms with the content of the performance data on the basis of the performance data in the summary record created in S201 and the deletion condition definition information 33, sets data representing the generated deletion condition in the blank performance condition field 18B in the summary record created in S201, and then stores the summary record in the performance information VOL 47 (S202). Further, thereupon, the performance record creation and storage portion 90A is able to update, on the basis of the deletion condition definition information 33, the deletion condition of at least one lower level record corresponding with the summary record to a new deletion condition according to which deletion is performed at a later time than the time at which deletion is executed according to the former deletion condition. As the update method, a method that rewrites the deletion condition data of the lower level record with other deletion condition data or a method that adds new deletion condition data to the deletion condition field 18B of the lower level record, for example, can be adopted.

The summary record creation and storage portion 90B references the collection time data in the summary record in the performance information VOL 47 and the summary definition information 33 in the definition VOL 49 and judges whether this is the timing for making an addition summary of the summary record (S203). When an affirmative judgment result is obtained in the processing in S203, the summary record creation and storage portion 90B causes the performance record creation and storage portion 90A to start the processing of S201 for an additional summary (S204).

The record deletion portion 90C references the deletion condition data in each summary record in the performance information VOL 47 and, if this point in time matches the deletion condition represented by the deletion condition data (if the difference between the collection time of the minute record and the current time is larger than the storage deadline set as the deletion condition, for example), the record deletion portion 90C then deletes the summary record containing this deletion condition data (S105). The record deletion portion 90C is able to perform the processing of S205 at regular intervals (or irregular intervals).

Figure 6A:
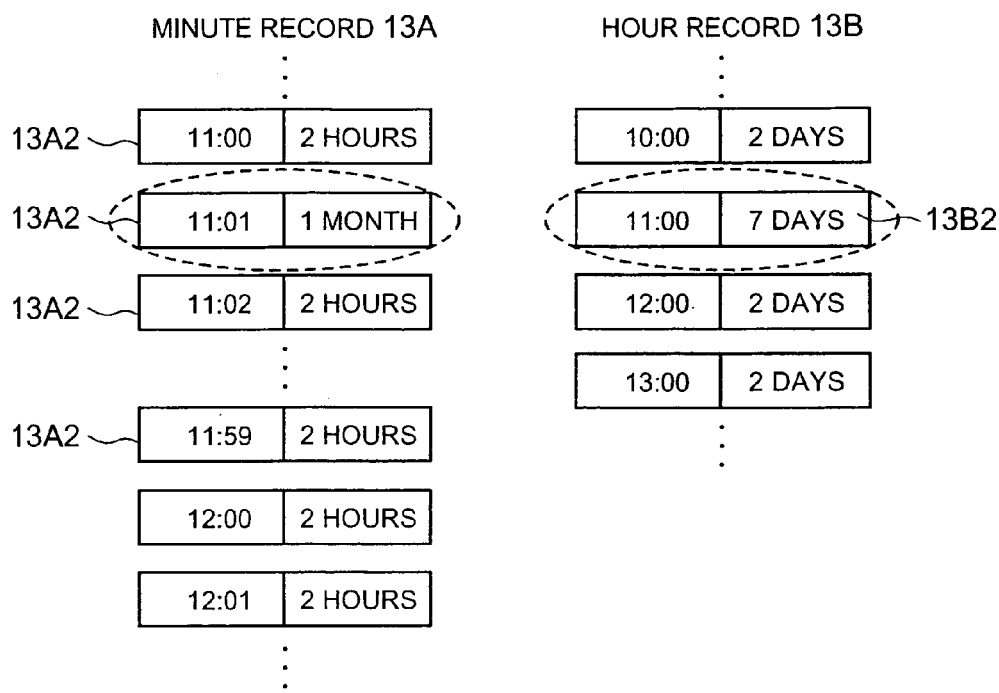
FIGS. 6A and 6B show an example of an aspect in which a deletion condition for an upper level record representing an abnormal state is reflected in a lower level record.
Figure 6B:
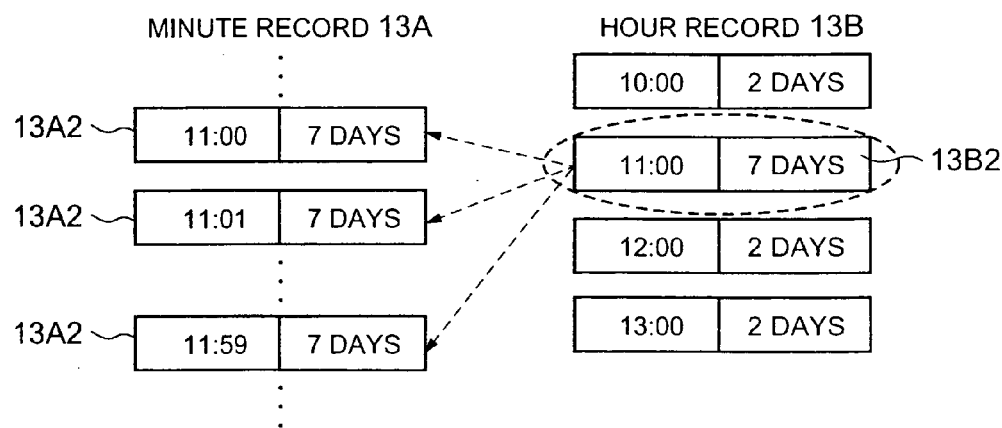
Figure 6C:
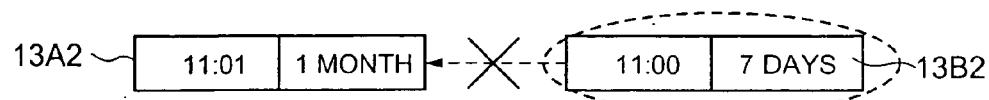
FIG. 6C represents a modified example thereof.

FIGS. 6A and 6B show an example of an aspect in which a deletion condition for an upper level record representing an abnormal state is reflected in a lower level record. FIG. 6C shows a modified example thereof. Further, in FIGS. 6A to 6C, the upper level record is an hour record and the lower level record is a minute record.

As shown in FIG. 6A, one of a plurality of minute records 13A2, 13A2, . . . , the collection time of which is the eleventh hour, is a minute record that represents an abnormal state and for which the storage deadline 'one month' is set as a deletion condition. The storage deadline 'two hours' is set as a deletion condition for another minute record that represents a normal state. The storage deadline 'two days' is set as the storage condition in an hour record that represents a normal state.

In this case, for example, as shown in FIG. 6A, when the storage deadline '7 days' is set as the deletion condition in an hour record representing an abnormal state (a record the collection time of which is 11 o'clock) 13B2, the summary record creation and storage portion 90B detects the fact that the collection time of the hour record 13B2 is 11 o'clock and thus specifies the plurality of minute records 13A2, 13A2, . . . the collection times of which are in the eleventh hour from the performance information VOL 47. Further, as shown in FIG. 6B, the summary record creation and storage portion 90B rewrites deletion condition data in the hour record 13B representing an abnormal state with deletion condition data of each of the specified plurality of minute records 13A2, 13A2, . . . irrespective of whether the minute record represents an abnormal state or a normal state.

Further, at such time, the summary record creation and storage portion 90B is able to judge, for the deletion condition data of the minute records 13A2, 13A2 representing an abnormal state, which of a first time for deleting a minute record in accordance with deletion condition data and a second time for deleting a minute record in accordance with deletion condition data in hour record 13B2 representing an abnormal state is later and determine whether to perform rewriting in accordance with the judgment result. More specifically, for example, the summary record creation and storage portion 90B actually performs the rewriting shown in FIG. 6B when it is judged that the second time is later but, upon judging that the first time is later, retains the current deletion condition data in the minute record representing an abnormal state instead of performing rewriting, as shown in FIG. 6C.

The data management system according to this embodiment was described above. According to this data management system, when an upper level record that contains performance data representing an abnormal state is generated, content that is based on a deletion condition set in the upper level record is reflected in the deletion condition of at least one lower level record that corresponds with the upper level record. As a result, when a lower level record of summary data containing performance data representing an abnormal state is to be acquired, a situation where the lower level record has been deleted and cannot be acquired can be prevented from occurring.

Further, the following modified examples of the above embodiment may be considered. The differences from the above embodiment will be mainly described below.

FIG. 7 shows a modified example of the server program 12 according to an embodiment of the present invention as well as an example of the flow of processing that is executed by the server program.

The record deletion portion 90C of the server program 12 can perform processing not only to delete a record but also to shift a record.

In a case where, in the processing of S105 or S106 above, the record deletion portion 90 must delete at least one of an upper level record that represents an abnormal state and a plurality of lower level records corresponding with the upper level record from the performance information VOL 47 due to conformity with the deletion conditions of these records, the upper level record containing normal performance data and the plurality of lower level records corresponding with the upper level record respectively are deleted from the performance information VOL 47 when there is conformity with the deletion conditions of such records.

However, in cases where at least one of an upper level record containing abnormal performance data and a plurality of lower level records corresponding with the upper level record is deleted (Y in S106 or Y in S206), the record deletion portion 90 shifts the record of the deletion target in the performance information VOL 47 to another logical volume (S107). More specifically, the record deletion portion 90 deletes the deletion target record from within the performance information VOL 47 and writes the deletion target record to another logical volume. When the performance information VOL 47 is provided in the performance monitoring server 2, it may be considered desirable to provide another logical volume constituting the writing destination in a storage device outside the performance monitoring server 2. This spares the storage region of the performance monitoring server 2.

Further, according to this modified example, it can be judged whether performance data contained in a record is abnormal or normal depending on whether the deletion condition contained in the record is abnormal or normal (for example, in FIGS. 6A to 6C, depending on whether 'two days' has been set as the storage period or another storage period has been set).

Moreover, according to this modified example, the record deletion portion 90 is able to determine another logical volume, which constitutes the migration destination, by referencing the a volume management table 88 that is illustrated in FIG. 7. The volume management table 88 may be registered in the server memory portion 35 or in the storage system 43. The ID, attribute, and usage status of each logical volume, for example, are registered in the volume management table 88. The attribute of the logical volume indicates in which type of storage device a logical volume is prepared. More specifically, for example, attributes include high reliability or high performance attributes (Fibre Channel, for example) and lower reliability or performance attributes (serial ATA, for example), for example. The usage status of the logical volume may be in use or unused, for example. The record deletion portion 90 is able to select a logical volume that is in an unused state and of low reliability or low performance (or high reliability or high performance), for example as the other logical volume constituting the migration destination.

Embodiments and modified examples of the present invention have been described hereinabove but constitute examples that serve to illustrate the present invention. There is no intention to limit the scope of the present invention to this embodiment and modified examples. The present invention can also be implemented in a variety of other forms.

What is claimed is:

1. A data management system that is capable of accessing a storage device, comprising:
   one or more processors; and
   a storage region for storing one or more computer programs that allow the one or more processors to operate as a result of being read by the one or more processors,
   wherein the one or more processors, to which the one or more computer programs are read from the storage region,
   acquire, at a first frequency, monitoring result data that represents monitoring results for a monitoring target, generate a monitoring result record that includes the monitoring result data thus acquired and first deletion condition data that represents a first deletion condition for the monitoring result data, and store the generated monitoring result record in the storage device;
   generate monitoring result summary data that represents a summary of a plurality of monitoring results represented by a plurality of the monitoring result record stored in the storage device at a second frequency that is lower than the first frequency, determine a second deletion condition for normal state when the content of the summary of the plurality of monitoring results represents normal content and determine a second deletion condition for abnormal state when the summary content represents abnormal content, generate a summary record that includes second deletion condition data that represents the second deletion condition thus determined and the monitoring result summary data thus generated, and then store the generated summary record in the storage device;
   specify a summary record including second deletion condition data representing the second deletion condition for abnormal state from the storage device and specify a plurality of the monitoring result records that form the basis of the generation of the specified summary record; and
   update the first deletion condition that is represented by the first deletion condition data of each of the plurality of monitoring result records thus specified to a second deletion condition for abnormal state that is represented by the second deletion condition data included in the specified summary record.

2. A data management system that is capable of accessing a storage device, comprising:

a lower level data acquisition/storage portion that acquires lower level data at a first frequency and stores the acquired lower level data in the storage device;

an upper level data acquisition/storage portion that acquires upper level data that is data above each of a plurality of the lower level data stored in the storage device at a second frequency that is lower than the first frequency and stores the upper level data thus acquired in the storage device;

a first deletion condition setting portion that, when the upper level data represents an abnormal state, sets a deletion condition from the storage device of the upper level data representing an abnormal state; and a second deletion condition setting portion that sets a deletion condition for each of a plurality of lower level data corresponding with the upper level data representing an abnormal state as a deletion condition that differs from the deletion condition of the lower level data representing a normal state, on the basis of the set deletion condition of the upper level data representing an abnormal state.

3. The data management system according to claim 2, wherein the deletion condition includes a deletion time at which data is deleted from the storage device;

the first deletion condition setting portion sets, as the deletion time of upper level data representing an abnormal state, a deletion time that is later than the deletion time of upper level data representing a normal state; and the second deletion condition setting portion sets the deletion times of each of the plurality of lower level data as deletion times that are later than the deletion times of the lower level data representing a normal state.

4. The data management system according to claim 3, wherein the lower level data acquisition/storage portion generates a lower level record that includes second deletion time data representing a second deletion time of the acquired lower level data and the acquired lower level data and stores the lower level record thus generated in the storage device;

the first deletion time setting portion sets a first deletion time for normal state that represents the deletion time of the upper level data representing a normal state and sets a first deletion time for abnormal state that represents the deletion time of the upper level data representing an abnormal state;

the upper level data acquisition/storage portion generates an upper level record that includes first deletion time data that represents the set first deletion time and the acquired upper level data and stores the generated upper level record in the storage device;

when the first deletion time data in the upper level record represents the first deletion time for abnormal state, the second deletion time setting portion changes the second deletion time represented by the second deletion time data of each of the plurality of lower level records corresponding with the upper level record representing an abnormal state to a later deletion time on the basis of the first deletion time for abnormal state.

5. The data management system according to claim 4, wherein, in certain lower level data among a plurality of lower level data corresponding with the upper level record representing an abnormal state, the second deletion time setting portion keeps the second deletion time as is when the second deletion time represented by the second deletion time data is later than the first deletion time for abnormal state.

6. The data management system according to claim 2, wherein the data management system is also able to access another storage device and further comprises a data deletion/shift portion that deletes or shifts data, wherein the data deletion/shift portion deletes the upper level data representing a normal state and each of the plurality of lower level data corresponding with the upper level data from the storage device when the deletion conditions of the data are matched, and shifts at least one of the upper level data representing an abnormal state and the plurality of lower level data corresponding with the upper level data from the storage device to the other storage device when the deletion conditions of the data are matched.

7. A data management method, comprising the steps of:

acquiring lower level data at a first frequency and storing the acquired lower level data in a storage device;

acquiring upper level data that is data above each of a plurality of the lower level data stored in the storage device at a second frequency that is lower than the first frequency and storing the upper level data thus acquired in the storage device;

setting, when the upper level data represents an abnormal state, a deletion condition from the storage device of the upper level data representing an abnormal state; and setting a deletion condition for each of a plurality of lower level data corresponding with the upper level data representing an abnormal state as a deletion condition that differs from the deletion condition of the lower level data representing a normal state, on the basis of the set deletion condition of the upper level data representing an abnormal state.

8. The data management method according to claim 7, comprising the steps of:

setting, as the deletion time of upper level data representing an abnormal state, a deletion time that is later than the deletion time of upper level data representing a normal state; and setting the deletion times of each of the plurality of lower level data as deletion times that are later than the deletion times of the lower level data representing a normal state.

9. The data management method according to claim 8, comprising the steps of:

generating a lower level record that includes second deletion time data representing a second deletion time of the acquired lower level data and the acquired lower level data and storing the lower level record thus generated in the storage device;

setting a first deletion time for normal state that represents the deletion time of the upper level data representing a normal state and setting a first deletion time for abnormal state that represents the deletion time of the upper level data representing an abnormal state;

generating an upper level record that includes first deletion time data that represents the set first deletion time and the acquired upper level data and storing the generated upper level record in the storage device;

when the first deletion time data in the upper level record represents the first deletion time for abnormal state, changing the second deletion time represented by the second deletion time data of each of the plurality of lower level records corresponding with the upper level record representing an abnormal state to a later deletion time on the basis of the first deletion time for abnormal state.

10. The data management method according to claim 9, comprising the steps of:
- in certain lower level data among a plurality of lower level data corresponding with the upper level record representing an abnormal state, keeping the second deletion time as is when the second deletion time represented by the second deletion time data is later than the first deletion time for abnormal state.

11. The data management method according to claim 7, comprising the steps of:
- deleting the upper level data representing a normal state and each of the plurality of lower level data corresponding with the upper level data from the storage device when the deletion conditions of the data are matched;
- shifting at least one of the upper level data representing an abnormal state and the plurality of lower level data corresponding with the upper level data from the storage device to the other storage device when the deletion conditions of the data are matched.

12. A computer-readable computer program that allows a computer to execute the steps of:
- acquiring lower level data at a first frequency and storing the acquired lower level data in a storage device;
- acquiring upper level data that is data above each of a plurality of the lower level data stored in the storage device at a second frequency that is lower than the first frequency and storing the upper level data thus acquired in the storage device;
- setting, when the upper level data represents an abnormal state, a deletion condition from the storage device of the upper level data representing an abnormal state; and
- setting a deletion condition for each of a plurality of lower level data corresponding with the upper level data representing an abnormal state as a deletion condition that differs from the deletion condition of the lower level data representing a normal state, on the basis of the set deletion condition of the upper level data representing an abnormal state.

* * * * *